United States Patent [19]

Lambla et al.

[11] Patent Number: 5,569,717
[45] Date of Patent: Oct. 29, 1996

[54] COMPOSITION BASED ON PROPYLENE POLYMER PROCESS FOR OBTAINING IT AND ITS USE

[75] Inventors: Morand Lambla, Hoenheim; Didier Graebling, Eckbolsheim, both of France

[73] Assignee: Solvay (Société Anonyme), Brussels, Belgium

[21] Appl. No.: 463,105

[22] Filed: Jun. 5, 1995

[30] Foreign Application Priority Data

Jun. 6, 1994 [BE] Belgium ................. 09400558

[51] Int. Cl.$^6$ ........................ C08L 23/04; C08L 23/10
[52] U.S. Cl. ................................ 525/193; 525/88
[58] Field of Search ........................ 525/193, 88

[56] References Cited

U.S. PATENT DOCUMENTS

| | | | |
|---|---|---|---|
| 4,424,293 | 1/1984 | Nojiri | 524/101 |
| 4,912,148 | 3/1990 | Kim | 524/487 |
| 5,451,639 | 9/1995 | Marczinke | 525/193 |

FOREIGN PATENT DOCUMENTS

| | | |
|---|---|---|
| 0073435 | 3/1983 | European Pat. Off. . |
| 0191990 | 8/1986 | European Pat. Off. . |
| 0520773 | 12/1992 | European Pat. Off. . |
| 59/093711 | 5/1984 | Japan . |
| 59/223740 | 12/1984 | Japan . |
| 60-188412 | 9/1985 | Japan . |

*Primary Examiner*—Vasu S. Jagannathan
*Attorney, Agent, or Firm*—Spencer & Frank

[57] ABSTRACT

Composition based on propylene polymer obtained by melt-blending of:

- 35 to 98.98% by weight of a polymer (a) chosen from propylene homopolymers and propylene copolymers containing at least 50 mol % of propylene,
- 1 to 50% by weight of a polymer (b) chosen from ethylene homopolymers and ethylene copolymers containing at least 90 mol % of ethylene, with
- from 0.01 to 10% by weight of a functional compound (c) chosen from compounds including at least 3 acrylate groups;
- from 0.01 to 5% by weight of a compound (d) capable of generating free radicals.

18 Claims, 2 Drawing Sheets

COMPOSITION BASED ON PROPYLENE POLYMER PROCESS FOR OBTAINING IT AND ITS USE

FIELD OF THE INVENTION

The present invention relates to a composition based on propylene polymer of modified rheological properties. It also relates to a process for obtaining this composition and to its use for the manufacture of objects by extrusion, calendering, injection moulding and thermoforming processes and for the manufacture of foams. Finally, it relates to shaped objects containing this composition.

TECHNOLOGY REVIEW

Crystalline propylene polymers are known for their mechanical properties and for their transparency and their heat resistance. Their relatively low cost makes them a material of choice for a large number of applications, such as the formation of shaped objects.

Nevertheless, their rheological properties and in particular their viscoelastic characteristics, are such that they can be difficult to process by some methods such as, for example, extrusion, calendering, injection moulding and thermoforming. These polymers are furthermore rather unsuited for forming foams.

Attempts have already been made to improve the properties of polypropylene by heat-treating a mixture containing polypropylene with an organic peroxide and a crosslinking agent chosen, for example, from divinylbenzene, allyl cyanurates and individual acrylates (JP-A-59/093,711). According to this document divinylbenzene is particularly well suited. In this way a polypropylene is obtained exhibiting an excellent surface gloss, good heat resistance, a high rate of crystallization, a high strength at the melting point and good rigidity.

When the crosslinking agent is an acrylate the rheological properties of these mixtures remain inadequate for some applications such as thermoforming and the manufacture of foams.

Furthermore, patent application JP-A-59/223,740 discloses, quite generally, polypropylene-based compositions exhibiting at the same time a good impact strength and a high rate of crystallization, which are obtained by a melt-blending polypropylene and polyethylene in the presence of an ethylene-propylene copolymer exhibiting an isotacticity, measured by $^{13}C$ nuclear magnetic resonance, lower than 0.7, of an organic peroxide and of a crosslinking agent similar to that described in document JP-A-59/093,711.

According to this document, which illustrates only the use of divinylbenzene as crosslinking agent, the presence of the polyethylene and of the ethylene-propylene copolymer is indispensable for obtaining the desired properties. As a result, these compositions, which contain three different and immiscible polymeric components, cannot easily be obtained in the form of stable, fine and homogeneous dispersions.

SUMMARY OF THE INVENTION

A new polypropylene-based composition has now been found which exhibits improved rheological properties in the molten state and, in particular, an increase in the resistance to deformation during elongation or extension and which does not exhibit the disadvantages of the compositions belonging to the prior art.

DETAILED DESCRIPTION OF THE INVENTION

Figure 1:
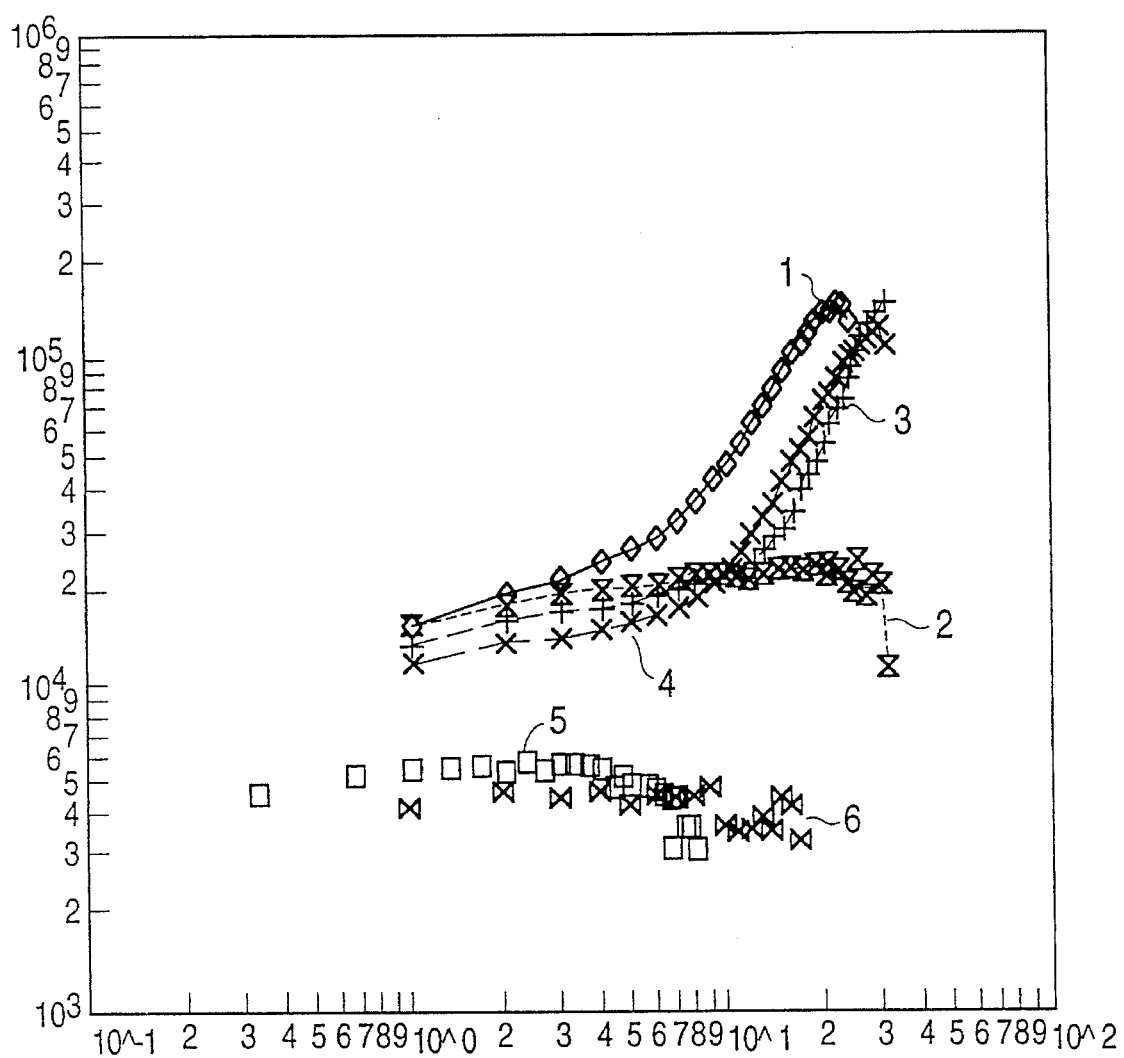
FIGS. 1 and 2 represent the elongational viscosity of compositions obtained in the Examples as determined by means of a rheometer. The curves represent the variation, at 190° C., in the melt elongational viscosity (expressed in Pa s) as a function of time (expressed in s) for an elgonational gradient (expressed in $s^{-1}$).

Consequently, the present invention relates to a composition based on propylene polymer, obtained by melt-blending:

35 to 98.98% by weight of a polymer (a) chosen from propylene homopolymers and propylene copolymers containing at least 50 mol % of propylene, 1 to 50% by weight of a polymer (b) chosen from ethylene homopolymers and ethylene copolymers containing at least 90 mol % of ethylene, with from 0.01 to 10% by weight of a functional compound (c) chosen from compounds including at least 3 acrylate groups;

from 0.01 to 5% by weight of a compound (d) capable of generating free radicals.

The polymer (a) is chosen from the homopolymers of propylene and the copolymers of the latter containing at least 50 mol % of the propylene and at least one other monomer chosen from α-olefins containing from 2 to 20 carbon atoms, unsaturated organic acids and their derivatives, vinyl esters, aromatic vinyl compounds, vinylsilanes and unconjugated aliphatic and monocyclic diolefins, alicyclic diolefins which have an endocyclic bridge and conjugated aliphatic diolefins. Ethylene, 1-butene, 1-pentene, 1-hexene, methyl-1-butenes, methyl-1-pentenes, 1-octene and 1-decene may be mentioned as examples of α-olefins.

By way of examples of other monomers there may be mentioned acrylic acid, methacrylic acid, maleic acid, methyl methacrylate, glycidyl acrylate and methacrylate, maleic anhydride, vinyl acetate and butyrate, styrene and methylstyrene, vinyltrimethylmethoxysilane and γ-methacryloyloxypropyltrimethoxysilane, as well as 1,4-hexadiene, 4-vinylcyclohexene, dicyclopentadiene, methylene-and ethylidenenorbornene, butadiene and isoprene.

Copolymers of propylene with α-olefins are particularly preferred and, among these, copolymers of propylene with at least one other monomer chosen from ethylene and 1-butene yield good results.

Within the scope of the present invention propylene copolymers are intended to mean both the random copolymers of propylene and the block copolymers of the latter.

The former generally consist of macromolecular chains in which the monomers are distributed statistically. The propylene content of these random copolymers is in most cases higher than 70 mol %, preferably higher than or equal to 75 mol %. The latter consist of distinct blocks of variable composition; each block consisting of a homopolymer of propylene or of another α-olefin or of a random copolymer including propylene and at least one other monomer chosen from the abovementioned monomers.

Copolymers with propylene blocks are generally obtained by polymerization in a number of consecutive stages in which the different blocks are prepared successively.

Propylene copolymers are generally preferred. Copolymers with propylene blocks yield good results.

Block copolymers which contain from 30 to 90% by weight of a first block which is a propylene homopolymer and from 70 to 10% by weight of a second block which is a random propylene copolymer containing from 40 to 60 mol % of ethylene yield particularly good results.

The polymer (b) is chosen from ethylene homopolymers and ethylene copolymers containing at least 90 mol % ethylene and at least one other monomer chosen from α-olefins containing from 3 to 20 carbon atoms and the other monomers described above in connection with the polymer (a). This other monomer is preferably chosen from α-olefins and diolefins. 1-Butene and 1-hexene are well suited. The quantity of ethylene in the polyethylene (b) is in most cases higher than or equal to 95 mol %. Polymers containing at least 97 mol % of ethylene are particularly well suited. The preferred ethylene polymers (b) in most cases have a relative density higher than 0.92 and more particularly from 0.94 to 0.98.

The polymers (a) and (b) are well known to a person skilled in the art. They are generally obtained by polymerization of the monomers in one or more stages in the presence of catalysts of the Ziegler-Natta type or of chromium-based catalysts.

The quantity of polymer (b) which is used is generally higher than or equal to 5% by weight and preferably higher than or equal to 10% by weight. When the polymer (a) is a propylene homopolymer it is found that this quantity is advantageously at least 20% by weight. In this particular case the quantity of polymer (b) is in most cases lower than 40% by weight. When the polymer (a) is a propylene copolymer the quantity of polymer (b) which is used is moreover advantageously lower than or equal to 30% by weight, more particularly lower than or equal to 20% by weight. In this case good results are obtained when the quantity of polymer (b) is from 10 to 20% by weight.

The functional compounds (c) which can be employed in the compositions according to the present invention generally contain at most 7 acrylate groups. Compounds (c) which contain from 3 to 5 acrylate groups yield good results. By way of preferred examples of these compounds there may be mentioned the following compounds commonly called: trimethylolpropane triacrylate, ethoxy trimethylolpropane triacrylate, propoxy glycerol triacrylate, pentaerythritol triacrylate, bistrimethylolpropane tetraacrylate, pentaerythritol tetraacrylate, ethoxy pentaerythritol tetraacrylate, trimethylolpropane trimethacrylate and ethoxy pentaerythritol triacrylate. It is obvious that one or more compounds (c) may be used.

All else being equal, trimethylolpropane triacrylate, ethoxy trimethylolpropane triacrylate, pentaerythritol triacrylate, bistrimethylolpropane tetraacrylate and ethoxy pentaerythritol tetraacrylate yield particularly good results.

The quantity of functional compound (c) is in most cases at least 0.05% by weight, preferably at least 0.5% by weight. Good results are obtained when the quantity of functional compound is lower than or equal to 6% by weight, more particularly lower than or equal to 2% by weight. Quantities of 0.5 to 2% by weight yield particularly good results.

The compound (d) capable of generating free radicals is in most cases chosen from organic peroxides, persulphates and diazo compounds. As examples of such compounds there may be mentioned N-bromosuccinimide, dicumyl and benzoyl peroxide, cumene hydroperoxide, 2,5-dimethyl-2,5-di-tert-butylperoxyhexane, potassium or ammonium persulphates, azobisisobutyronitrile and the like. The compounds which are best suited are those which decompose at the temperatures at which the melt blending is performed. Peroxides are generally preferred. Among these, 2,5-dimethyl-2,5-di-tert-butylperoxyhexane, tert-butyl cumyl peroxide and dicumyl peroxide yield good results.

The quantity of compound (d) which is used is in most cases higher than or equal to 0.01% by weight. It is moreover generally lower than or equal to 1% by weight, more particularly lower than or equal to 0.1% by weight. Quantities of 0.01 to 0.1% by weight yield good results.

The compositions according to the present invention are obtained by melt-blending the various components. In most cases this melt-blending is carried out in conditions such that there is at least a partial reaction of the molecules of the functional compound (c) with each other and/or with the polymers (a) and/or (b).

The conditions in which this blending is performed are not critical, provided that they produce at least partial melting of the polymers (a) and (b). They are preferably such that there is complete melting of the polymers (a) and (b).

The blending is generally performed at a temperature not exceeding 400° C., preferably not exceeding 300° C. and more particularly not exceeding 250° C. The minimum temperature at which the melt blending is performed is higher than or equal to 130° C., preferably higher than or equal to 150° C. and more particularly higher than 180° C. Very good results are obtained when this temperature is higher than 180° C. and lower than or equal to 230° C.

The blending time is chosen by taking into account the nature of the compounds used and the blending temperature. This time generally varies from 5 seconds to 120 minutes, in most cases from 10 seconds to 30 minutes.

Blending of the polymers (a) and (b) with the compounds (c) and (d) is performed in any known devices for this purpose. It is thus possible to employ internal or external mixers. Internal mixers are the most appropriate ones and, among these, the noncontinuous mixers of Brabender type and the continuous mixers such as extruders.

Extruders are generally preferred. The order of introduction of the different components into the mixer is not critical. They can equally well be introduced in isolation and successively or a premix of the different constituents with each other or of only a part of these constituents may be produced.

When the polymer (a) is a propylene homopolymer it is found particularly advantageous to perform a premixing of this polymer with the polymer (b) preferably in the melt. The premix is next subjected to a melt-blending with the compounds (c) and (d) to obtain the compositions according to the invention.

The compositions according to the present invention may also contain other conventional additives such as, for example, stabilizers, lubricants, antistatic agents, nucleating agents, foaming agents, glass fibres or any other fillers.

Good results are obtained when the compositions according to the invention are obtained in the absence of any elastomer other than the polymers (a) and (b). The preferred compositions are obtained in conditions such that the polymers (a) and (b) constitute at least 99% by weight of all the polymers used. Compositions exhibiting the best performance are obtained by using as polymer solely the polymers (a) and (b).

The compositions according to the present invention exhibit particularly advantageous rheological and viscoelastic properties. It is found, in fact, that in the molten state they exhibit an increase in the resistance to deformation during elongation or extension. Such a phenomenon is generally called "structural stress-hardening". It can be easily characterized by the determination, at a given temperature and rate of elongation, of the change in the elongational viscosity of the composition in the molten state as a function of the elongation time. When subjected to such tests, the compositions according to the present invention exhibit an increase in elongational viscosity until the melt ruptures. Such a behaviour makes the compositions according to the present invention particularly advantageous for obtaining articles shaped by injection moulding and by extrusion and in particular by blow-extrusion or injection blow moulding, thermoforming or coating (see, for example, ANTEC 92/569). Such a property is also essential for the manufacture of foams. Such uses of the compositions according to the invention, as well as the shaped objects containing the said compositions, consequently constitute additional aspects of the present invention.

It is observed, moreover, that the dispersion of the polymers (a) and (b) in the compositions according to the invention is remarkably fine, homogeneous and stable, that is to say that it is retained in the melt in the absence of shear or of kneading. Such a property enables the compositions according to the invention to be processed many times without observing large decreases in their performance, and this facilitates their recycling.

It is also observed that the compositions according to the present invention contain few, and advantageously no, agglomerates of higher viscosity (called gels hereinafter) capable of impairing the shaped objects containing them.

Finally, the present invention relates to a process for obtaining a composition based on propylene polymer, including a stage of melt-blending of:

35 to 98.98% by weight of a polymer (a) chosen from propylene homopolymers and propylene copolymers containing at least 50 mol % of propylene, 1 to 50% by weight of a polymer (b) chosen from ethylene homopolymers and ethylene copolymers containing at least 90 mol % of ethylene, with from 0.01 to 10% by weight of a functional compound (c) chosen from compounds including at least 3 acrylate groups;

from 0.01 to 5% by weight of a compound (d) capable of generating free radicals.

The various characteristics of this process are identical with those described above in connection with the compositions according to the present invention.

The process according to the present invention has the advantage of being particularly simple to implement. It also makes it possible to obtain the compositions according to the invention reproducibly and in relatively short periods of time.

EXAMPLES

The following Examples serve to illustrate the invention.

In these Examples the compositions according to the invention are obtained with the aid of a corotative twin-screw extruder of Werner & Pfleiderer ZSK 30 type, in which the screws consist successively of feed, mixing and devolatilization zones. The feed zone temperature is 160° C. at the entry and 180° C. at the exit; the mixing zone temperature is 190° C. at the entry and 210° C. at the exit, the devolatilization zone temperature is 210° C.

The rate of rotation of the screws is 150 revolutions/min at a stock throughput of 5 kg/h. The various products are premixed in a drum.

The elongational viscosity of the compositions obtained in the examples is determined by means of a rheometer marketed by Rheometrics under the name Rheometrics Extensional Rheometer RER-9000. The curves reproduced in FIGS. 1 and 2 appended herewith (called RER diagrams hereinafter) represent the variation, at 190° C., in the melt elongational viscosity (expressed in Pa s) as a function of time (expressed in s) for an elongation gradient (expressed in $s^{-1}$) of 0.1 in the case of Examples 1 to 4, 8, 9, 2R, 6R and 7R, and 0.3 in the case of Example 5R. In FIG. 1, curve 1 corresponds to Example 1, curve 2 to Example 2R, curve 3 to Example 3, curve 4 to Example 4, curve 5 to Example 5R and curve 6 to Example 6R; in FIG. 2, curve 1 corresponds to Example 7R, curve 2 to Example 8 and curve 3 to Example 9.

The determination of the gel content of the compositions is performed with a mixture of xylene isomers (boiling point between 137° and 140° C.) with the aid of a Soxhlet extractor. The extraction is continued for 35 hours.

EXAMPLE 1

The extruder is fed with a mixture containing:

2700 g of a propylene block copolymer marketed by Solvay under the name Eltex®P RL 001 P;

300 g of a polyethylene marketed by Solvay under the name Eltex A 1050 P;

36 g of trimethylolpropane triacrylate (TMPTA);

1 g of 2,5-dimethyl-2,5-di-tert-butylperoxyhexane (DHBP).

The composition thus obtained is free from gels.

The RER diagram illustrated by curve 1, FIG. 1, shows the phenomenon of structural stress hardening.

EXAMPLE 2R

The extruder is fed with the mixture of polymers of Example 1 but without addition of TMPTA or of DHBP.

The RER diagram of this composition, illustrated by curve 2 of FIG. 1 shows the absence of stress hardening. In fact, the elongational viscosity decreases to a ductile rupture of the sample.

EXAMPLE 3

The extruder is fed with the same mixture as that in Example 1, except that the copolymer containing propylene blocks is replaced by a random propylene copolymer marketed by Solvay under the name Eltex P KF 001 P. The RER diagram of the composition thus obtained, illustrated by curve 3 (FIG. 1) shows the same phenomenon of stress hardening as that exhibited by the composition of Example 1. This composition is free from gels.

EXAMPLE 4

Example 3 is reproduced, except that TMPTA is replaced with ethoxy trimethylolpropane triacrylate.

The RER diagram of this composition (curve 4, FIG. 1) also shows the phenomenon of stress hardening.

EXAMPLE 5R

The extruder is fed with the mixture of polymers from Example 3 but without addition of TMPTA or of DHBP.

The RER diagram of this composition (curve 5, FIG. 1) shows the same phenomenon as that of the composition of Example 2R.

EXAMPLE 6R

Example 1 is reproduced but with the polyethylene omitted and using 3000 g of a homopolymer marketed by Solvay under the name Eltex P HL 001 P. The RER diagram of the composition thus obtained (curve 6, FIG. 1) does not show the stress hardening phenomenon.

This example demonstrates the importance of the polyethylene for obtaining good rheological properties of the compositions according to the present invention.

EXAMPLE 7R

Figure 2:
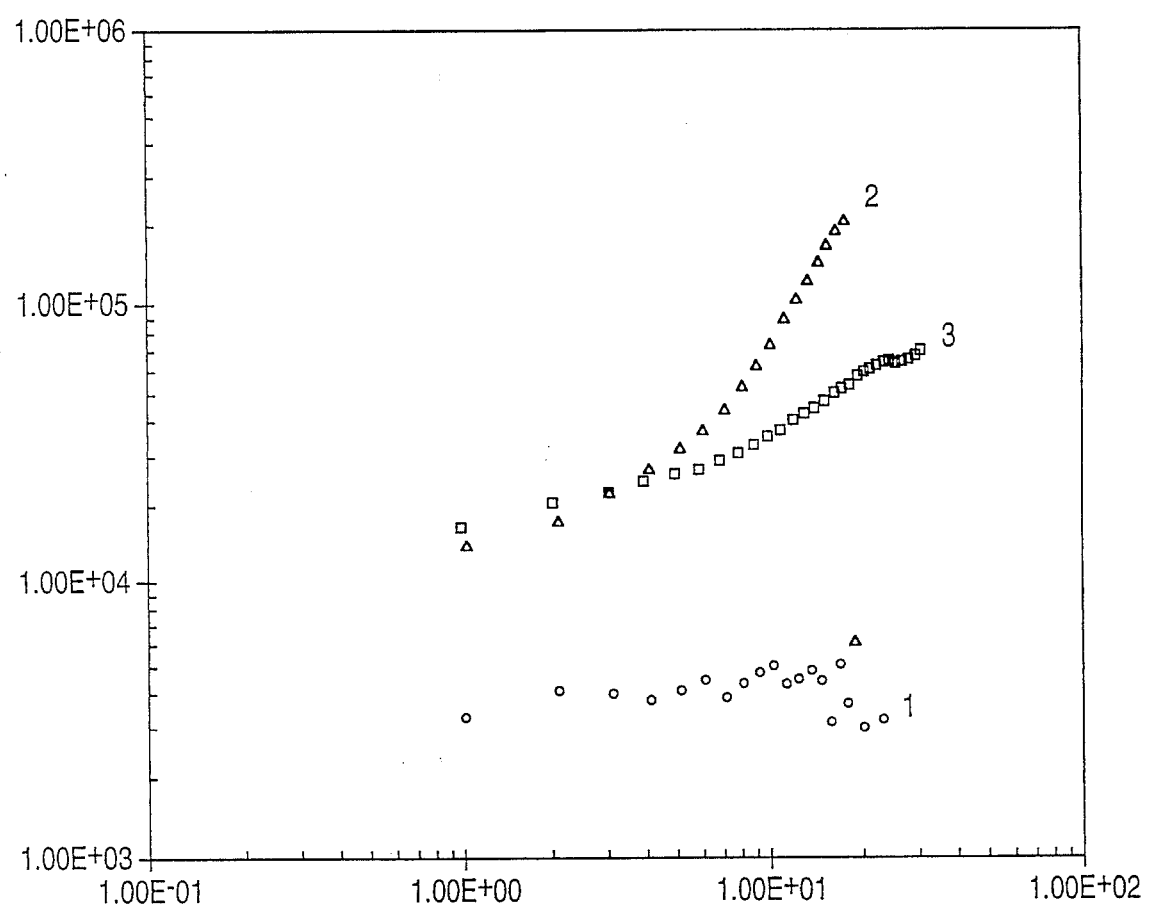

Example 1 is reproduced, except that TMPTA is replaced with an equivalent quantity of triethylene glycol dimethacrylate (TEGDMA). The RER diagram illustrated by curve 1 of FIG. 2 shows the absence of structural stress hardening phenomenon.

EXAMPLE 8

Example 1 is reproduced, except that TMPTA is replaced with an equivalent quantity of dimethylolpropane trimethacrylate (TRIM). Here again, the RER diagram illustrated by curve 2 of FIG. 2 shows the structural stress hardening phenomenon.

EXAMPLE 9

A melt-premixing is performed in a first step by feeding the extruder with a mixture containing 2400 g of a propylene homopolymer marketed under the name Eltex P HL 402 and 600 g of Eltex A 1050 P polyethylene. The rate of rotation of the extruder screws is 100 revolutions/min and the stock througput is 4 kg/h.

Example 1 is then reproduced by feeding the extruder with this mixture and 0.6 g/kg of DHBP and 12 g/kg of TMPTA.

A composition exhibiting the structural stress hardening phenomenon is thus obtained (FIG. 2, curve 3).

What is claimed is:

1. A composition prepared by melt-blending of:
   (a) 35 to 98.98% by weight of a polymer selected from the group consisting of propylene homopolymer and propylene copolymers containing at least 50 mol % of propylene,
   (b) 1 to 50% by weight of a polymer selected from the group consisting of ethylene homopolymers and ethylene copolymers containing at least 90 mol % of ethylene, with
   (c) from 0.01 to 10% by weight of a functional compound selected from the group consisting of compounds including at least 3 acrylate groups; and
   (d) from 0.01 to 5% by weight of a compound capable of generating free radicals.

2. The composition according to claim 1, wherein the polymers (a) and (b) constitute at least 99% by weight of all the polymers used.

3. The composition according to claim 1, wherein the polymer (a) is chosen from propylene copolymers.

4. The composition according to claim 3, wherein the polymer (a) is chosen from copolymers containing propylene blocks.

5. The composition according to claim 1, wherein the polymer (b) is chosen from ethylene polymers whose relative density is from 0.94 to 0.98.

6. The composition according to claim 1, wherein polymer (a) is a propylene homopolymer and the quantity of polymer (b) used is at least 20% by weight.

7. The composition according to claim 3, wherein the quantity of polymer (b) used is from 10 to 20% by weight.

8. The composition according to claim 1, wherein the functional compound (c) is chosen from compounds containing from 3 to 5 acrylate groups.

9. The composition according to claim 8, wherein the functional compound (c) is chosen from trimethylolpropane triacrylate, ethoxy trimethylolpropane triacrylate, propoxy glycerol triacrylate, pentaerythritol triacrylate, bistrimethylolpropane tetraacrylate, pentaerythritol tetraacrylate, ethoxy pentaerythritol tetraacrylate, trimethylolpropane trimethacrylate and ethoxy pentaerythritol triacrylate.

10. The composition according to claim 1, wherein the quantity of functional compound (c) is from 0.5 to 2% by weight.

11. The composition according to claim 1, wherein the compound (d) is a peroxide.

12. The composition according to claim 1, wherein the quantity of compound (d) is from 0.01 to 0.1% by weight.

13. The composition according to claim 1, exhibiting a structural stress hardening.

14. In a method of manufacturing objects by blow-extrusion or injection blow moulding, thermoforming or coating a composition, the improvement comprising said composition according to claim 1.

15. In a foam, the improvement comprising said foam of a composition according to claim 1.

16. Manufactured objects containing a composition according to claim 1.

17. A process for obtaining a composition based on propylene polymer, including a stage of melt-blending of:
   (a) 35 to 98.98% by weight of a polymer selected from the group consisting of propylene homopolymers and propylene copolymers containing at least 50 mol % of propylene,
   (b) 1 to 50% by weight of a polymer selected from the group consisting of ethylene homopolymers and ethylene copolymers containing at least 90 mol % of ethylene, with
   (c) from 0.01 to 10% by weight of a functional compound selected from the group consisting of compounds including at least 3 acrylate groups; and
   (d) from 0.01 to 5% by weight of a compound capable of generating free radicals.

18. A process for obtaining a composition based on propylene polymer, comprising the step of melt-blending
   (a) 35 to 98.98% by weight of a polymer selected from the group consisting of propylene homopolymers and propylene copolymers containing at least 50 mol % of propylene,
   (b) 1 to 50% by weight of a polymer selected from the group consisting of ethylene homopolymers and ethylene copolymers containing at least 90 mol % of ethylene, with
   (c) from 0.01 to 10% by weight of a functional compound selected from the group consisting of compounds including at least 3 acrylate groups; and
   (d) from 0.01 to 5% by weight of a compound capable of generating free radicals.

* * * * *